Figure 1:
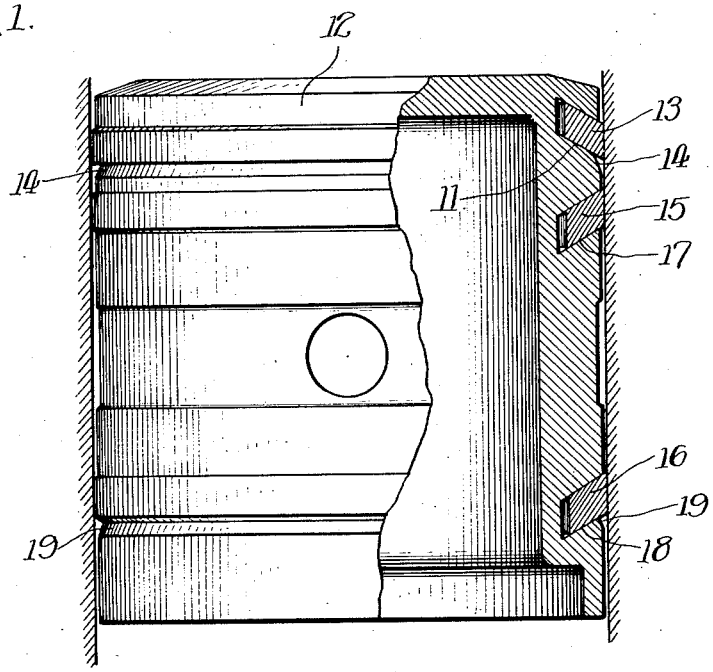

May 11, 1926.

H. L. QUINTENZ

INTERNAL COMBUSTION ENGINE PISTON

Filed June 30, 1923

1,584,470

Witness
A. J. Sauser

Inventor:
Harry L. Quintenz
By Walter M. Fuller
Atty.

Patented May 11, 1926.

1,584,470

UNITED STATES PATENT OFFICE.

HARRY L. QUINTENZ, OF WINTER, WISCONSIN.

INTERNAL-COMBUSTION-ENGINE PISTON.

Application filed June 30, 1923. Serial No. 648,779.

My invention pertains to features of novelty and advantage in internal-combustion engine pistons and their associated piston-rings, the leading aim and purpose of the invention being the provision of a piston and its rings which will more effectively and more efficiently prevent the upward or inward passage of the lubricating oil by the piston-rings into the combustion or explosion chamber where it tends to carbonize, to foul the spark-plugs, and to reduce the compression volume of the chamber which in some cases results in the well-known carbon "knock".

A further object of the invention is to produce a structure of this general character which seals the compression of the engine and thereby prevents the downward escape past the piston-rings of the compressed explosive mixture or the hot gases of combustion.

In the preferred embodiment of the invention the upper or inner piston-ring and its piston-groove are so constructed that they tend to discharge downwardly and outwardly any oil which finds access to such groove thus eliminating the possibility of any substantial or objectionable quantity of oil finding its way to the cylinder space or chamber above the piston, and cooperatively or conjointly associated with such piston-ring and its groove, I employ one or more somewhat different rings and grooves which are constructed to trap a small amount of oil and form one or more oil seals for maintaining good engine compression.

In order that those skilled in this art may have a full and complete understanding of the invention both from its structural and functional standpoints, in the accompanying drawing forming a part of this specification I have illustrated a preferred embodiment of such invention and in the two figures of this drawing like reference characters have been used to designate the same parts.

Figure 2:
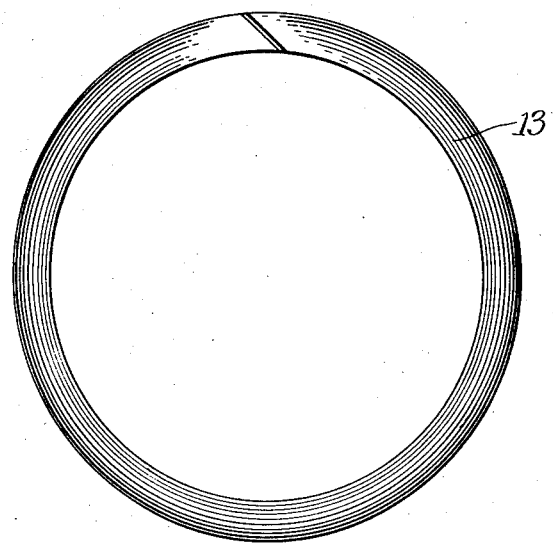

In this drawing:

Figure 1 is a partial elevation and partial section of one of the improved pistons and its piston-rings and their grooves, and Figure 2 is a face view of one of these piston-rings.

Referring to this drawing, it will be perceived that the upper or inner piston-ring groove 11 in the piston 12 slopes upwardly and inwardly with its top and bottom inclined faces parallel, whereby any oil on its bottom wall tends to flow downwardly and outwardly from the groove, the latter accommodating a similarly-shaped, elastic, transversely-split piston-ring 13, whereby the oil is prevented from passing upwardly by the piston-ring on to the top of the piston or into the combustion-chamber above the piston.

It will be clear that the more or less automatic drainage of such groove precludes an undue amount of lubricant from overcoming the draining or oil eliminating function and from finding admittance to the explosion or combustion chamber.

Such oil discharging or lubricant shedding function is facilitated in some degree by providing the outer face of the piston just below such groove with an annular depression or small groove 14, thus at this point giving greater clearance between the piston and the closely-adjacent cylinder-wall.

One or more other lower piston-rings may be used and each of these, of which two 15 and 16 are employed in the appliance illustrated, although the exact number is of small moment, is of such shape in cross-section, as is clearly illustrated, as to fit a corresponding or complementary piston groove 17 or 18, as the case may be, sloped in a direction the opposite of that of the upper or inner groove 11.

Stated somewhat otherwise, the two sloping walls of either groove 17 or 18 are parallel and inclined in the opposite direction from the corresponding wall of the upper groove.

As a result of this type of construction with a substantial inner portion of each groove 17 and 18 below the lower, external edge of the groove at the cylindrical surface of the piston, such part of the groove constitutes or forms an oil pocket from which the liquid contents cannot readily escape, such trapped oil thus sealing the corresponding piston-ring and preventing a loss of engine compression at this point.

Thus the one type of ring and groove acts in a practically opposite manner from that of the associated or companion ring and groove, the one being designed and arranged to trap and hold a certain amount of oil used as a sealing medium and the other employed to quickly rid itself of the oil which enters or is inclined to find admission thereto.

In some cases, it has been found to be of advantage to provide the piston with a shallow groove 19 just below one or more of the piston-ring grooves 17 and 18, one such groove being illustrated in Figure 1.

The two grooves 14 and 19, which may be of any appropriate shape in cross-section, form small, annular, oil-seal pockets which tend to assist in maintaining the desired compression by supplying an oil film between the piston and the cylinder wall at these places.

Those skilled in this art will readily understand that the invention is not confined and restricted to the precise and exact details of construction presented and will comprehend that the invention is susceptible of a variety of embodiments differing more or less radically from that shown and described all embodying the main features or principles of the invention and none sacrificing any of its substantial benefits and advantages.

I claim:

A piston having an upper groove, a lower groove, and an intermediate groove, a supplemental groove being formed at the bottom edge of the upper groove and the lower groove, the upper groove being upwardly and inwardly inclined from the outer face of the piston and the lower and intermediate grooves being downwardly and inwardly inclined from the outer face of the piston, and a piston ring received in each of the grooves, the upper piston ring being adapted to scrape oil from the cylinder wall and the lower and intermediate piston rings forming a seal to prevent downward escape of the compressed explosive mixture, the oil from the cylinder wall being received in the lower and intermediate grooves to form a seal therein, the supplemental groove at the bottom of the upper groove aiding in draining oil from said groove and spreading oil over the cylinder wall and the supplemental groove adjacent the bottom of the lower groove aiding in spreading the oil over the cylinder wall.

In witness whereof I have hereunto set my hand and seal.

HARRY L. QUINTENZ. [L. S.]